US006989507B2

(12) United States Patent
Clark

(10) Patent No.: US 6,989,507 B2
(45) Date of Patent: Jan. 24, 2006

(54) LASER DEPOSITION

(75) Inventor: Daniel Clark, London (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/764,440

(22) Filed: Jan. 27, 2004

(65) Prior Publication Data

US 2004/0182844 A1 Sep. 23, 2004

(30) Foreign Application Priority Data

Feb. 3, 2003 (GB) .................................. 0302399

(51) Int. Cl.
*B23K 26/34* (2006.01)
(52) U.S. Cl. ........................... 219/121.64; 219/121.66; 219/121.85
(58) Field of Classification Search .............. 219/121.6, 219/121.63, 121.64, 121.65, 121.66, 121.83–121.85
See application file for complete search history.

(56) References Cited

U.S. PATENT DOCUMENTS

| | | | |
|---|---|---|---|
| 4,048,705 A | * | 9/1977 | Blanpain et al. ............... 419/61 |
| 5,578,227 A | * | 11/1996 | Rabinovich ............ 219/121.63 |
| 5,958,261 A | | 9/1999 | Offer et al. |
| 6,087,627 A | * | 7/2000 | Kramer .................. 219/130.21 |
| 6,118,098 A | * | 9/2000 | Amos et al. ............. 219/137 R |
| 6,429,402 B1 | * | 8/2002 | Dixon et al. ........... 219/121.63 |
| 6,441,338 B1 | * | 8/2002 | Rabinovich ............ 219/121.64 |
| 2003/0222059 A1 | * | 12/2003 | De Kock et al. ....... 219/121.63 |

FOREIGN PATENT DOCUMENTS

| | | | |
|---|---|---|---|
| DE | 39 05 684 A1 | | 8/1990 |
| JP | 360130462 A | * | 7/1985 |
| JP | 36193792 A | * | 8/1986 |
| JP | 61023863 | * | 8/1987 |
| JP | 02-092479 | | 4/1990 |
| JP | 02-92480 | | 4/1990 |
| JP | 404182322 A | * | 6/1992 |
| JP | 408118049 A | * | 5/1996 |
| JP | 02003048087 A | * | 2/2003 |

* cited by examiner

*Primary Examiner*—Samuel M. Heinrich
(74) *Attorney, Agent, or Firm*—Oliff & Berridge, PLC

(57) ABSTRACT

The present invention relates to laser deposition and more particularly to use of deposition wire (5, 21) in order to create structures or components. The original deposition wire (5, 21) is reconfigured in order to increase its lateral dimension and so provide a greater overlap with a presented beam (3) from a laser (2). The presented beam (3) therefore more consistently melts the presented reconfigured deposition wire (31, 41, 51, 61, 71, 81) in order to form the desired structure or component.

2 Claims, 2 Drawing Sheets

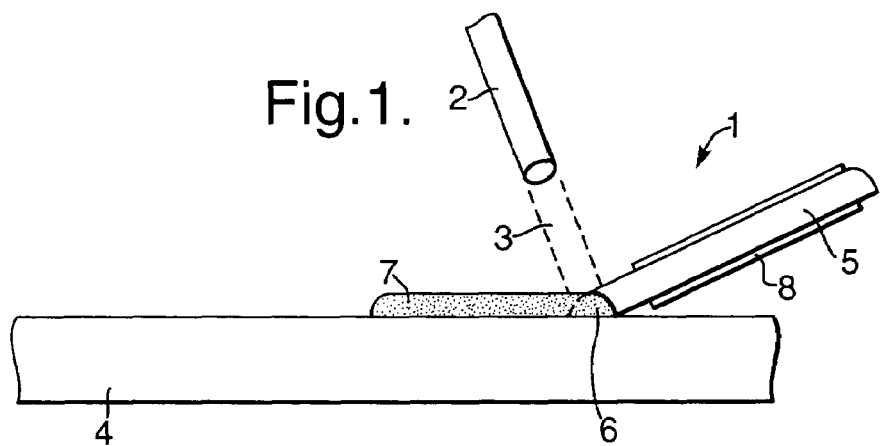
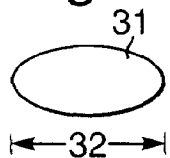
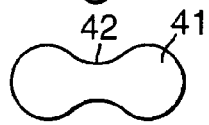
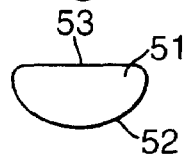
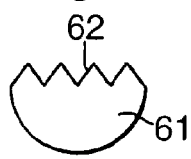
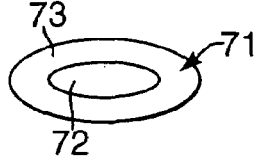
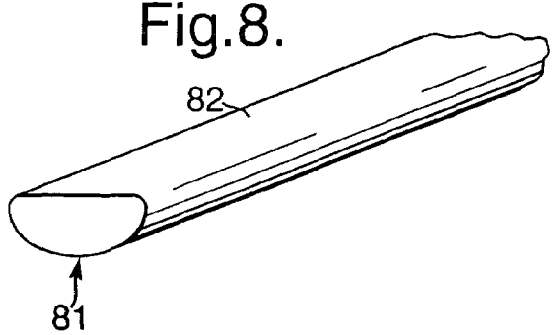

LASER DEPOSITION

The present invention relates to laser deposition and more particularly to laser deposition using a wire which is deposited by laser beam heating.

It is known to create structures and components by successive deposition of materials. Several techniques are known and one example technique of such structure and component deposition is by so-called direct laser deposition (DLD). In this technique a wire or powder of deposition material is presented below a laser beam such that the laser beam heats the deposition material, it melts and when re-solidified becomes an integral part of a component structure. As indicated, typically wires or powders are used for the deposition material. It will be understood that the consistency of deposition is a desirable objective. However, although wire has the advantage of more accurate positioning it will be understood that such wire presents problems with respect to consistency of deposition particularly in terms of variations of the wire as a result of the manner by which it was drawn as well as variations in the surface of the wire. It will also be understood that wire has a substantially round cross-section and so a relatively large portion of the laser beam is spuriously scattered rather than utilised. Powders may present more consistent material to the laser beam but clearly require particular consideration with respect to accurate presentation of the powder for deposition. With powders there is a significant proportion of powder scatter and it will be understood that generally the deposition material will be relatively expensive and such scattered powder significantly adds to the cost of component and structure deposition.

In accordance with the present invention there is provided a method of laser deposition using a laser and deposition wire, the method characterised in that the wire is heated and cross-sectionally reconfigured to increase the lateral dimension of the wire for greater overlap with a presented laser beam such that the wire is more consistently melted for deposition.

Typically, the wire is reconfigured to an oval or rectangle or dumbbell or semi-circle or serrated top cross-section. Possibly, the wire comprises a deposition powder core held within a sheath. Preferably, the wire is heated by induction heating. The wire is heated to facilitate the reconfiguration of the wire and to inhibit work hardening of the wire by such reconfiguration.

Normally, at least a presented surface of the wire is knurled or otherwise roughened. Typically, this operation will be conducted prior to reconfiguration.

Also in accordance with the present invention there is provided a laser deposition apparatus comprising a laser and means to present a deposition wire, the apparatus characterised in that means are provided to heat and cross-sectionally reconfigure the wire to increase the lateral dimension whereby in use there is a greater range of acceptable angles of incidence for the laser in order to melt that wire and cause deposition.

Further in accordance with the present invention there is provided a wire reconfiguration arrangement for laser deposition apparatus, the arrangement characterised in that a deposition wire presented to the arrangement in use is reconfigured in the lateral dimension in order to provide a presented surface which is substantially flatter than the wire presented to the arrangement.

Preferably, the means of heating the wire is inductive. Normally, such induction is provided by an electrical coil through which the wire passes. Preferably, the apparatus or arrangement includes means to knurl or otherwise roughen at least a presented surface of the wire.

Generally, the reconfiguration is by press rollers presented about the wire as it passes through the apparatus or arrangement to be presented in use to a beam of a laser.

Embodiments of the present invention will now be described by way of example only with reference to the accompanying drawings in which:

FIG. 1 is a basic schematic cross-section illustrating direct laser deposition;

FIG. 2 is a schematic cross-section of an original wire;

FIG. 3 is a schematic cross-section of a first reconfigured wire;

FIG. 4 is a schematic cross-section of a second reconfigured wire;

FIG. 5 is a schematic cross-section of a third reconfigured wire;

FIG. 6 is a schematic cross-section of a fourth reconfigured wire;

FIG. 7 is a schematic cross-section of a fifth reconfigured wire;

FIG. 8 is schematic front perspective of a knurled reconfigured wire;

Figure 9:
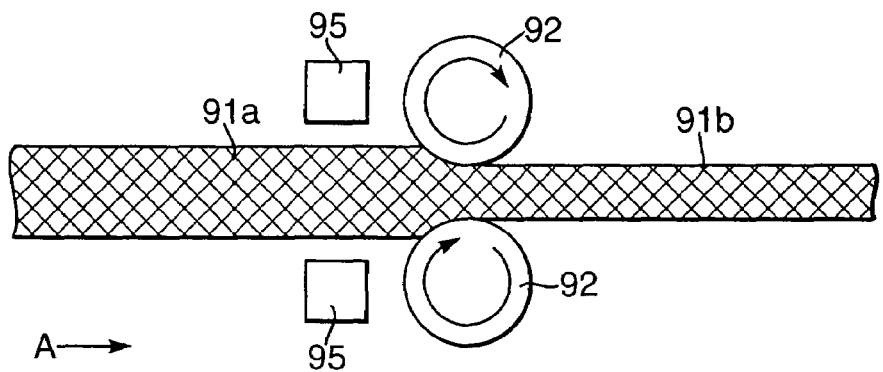
FIG. 9 is a schematic cross-section of a reconfiguration arrangement in accordance with the present invention.

Referring to FIG. 1 which is a schematic illustration of a basic direct laser deposition apparatus 1. Thus, the laser deposition apparatus 1 comprises a laser 2 which presents a laser beam 3 towards a base 4. A deposition wire 5 is presented towards the base 4 such that the incident laser beam 3 melts a deposition pool 6 which upon solidification provides a layer of deposited material 7. It will be appreciated that successive passes of deposited material 7 can be provided in order to create a structure or component as required. This structure or component will generally be hollow and cut or otherwise removed from the base 4 when required. In such circumstances, by successive passes of deposition, a component is built up progressively from successive layers of deposited material 7 taken from the wire 5.

As indicated above, the wire 5 allows accurate presentation upon the base 4 and successive layers of the deposited material 7. This presentation is generally through a sleeve 8 and the wire 5 drawn from a reel or other dispensing mechanism. Unfortunately, the wire 5 is round when presented. As a result of that round cross-section, as well as varying surface condition and possible variable work hardening etc in the wire 5 during the wire drawing process, the melt response of the wire 5 can be variable. As indicated previously, traditionally the problems with wire have been avoided for high quality components and structure by use of powders but implicitly with such structures relatively expensive materials are used and so powder scatter can be an expensive consequence of that approach.

In accordance with the present invention, the deposition wire is reconfigured just prior to presentation to the laser beam. This reconfiguration substantially provides an increase in the lateral dimension of that wire. The lateral dimension is the cross-sectional dimension substantially perpendicular to the beam.

One type of known laser has a generally circular focal spot, with a diameter of the order of 1 mm. The energy distribution across the focal spot is not uniform, the intensity being lower towards the edges. For this reason, it is desirable for the lateral dimension of the wire to be slightly less than the diameter of the focal spot, to ensure complete melting of the wire. This also allows for a certain leeway in the positioning of the wire beneath the laser beam, without the risk of incomplete melting. Typically, the wires used with such lasers are relatively fine, with a diameter of the order of 0.5 mm to 0.8 mm.

Another type of known laser, known as a diode laser, typically has a focal spot of generally rectangular cross-section, and the larger dimension of this rectangle can be as large as approximately 10 mm. If such a laser is used in a laser deposition process it may be appropriate to use a tape, rather than a wire, to provide the deposition material. Such a tape will have a generally rectangular cross-section, rather than the generally circular cross-section associated with a wire. It will be understood that the reconfiguration techniques described in this specification can equally well be applied to a tape as to a wire, and the term "wire" when used in this specification is to be understood also to encompass a tape of appropriate cross-sectional shape and dimensions.

FIG. 2 illustrates a typical initial or original wire 21 cross-section. As can be seen, this cross-section is substantially round as a result of drawing through a wire drawing die. A round cross-section is preferred by such a drawing process as it is symmetrical in terms of its application to the drawn metal but unfortunately during storage the wire is wound typically about a reel coil possibly under tension, and this creates variations in the specific treatment of the wire at different section as well as allows the surface of the wire to vary in terms of surface finish contamination and therefore responsivity to laser beam heating for melting. In such circumstances, when the wire 21 is presented to the laser beam there may be slight variations in the speed of melt and this may create defects in the currently deposited layer and therefore quality of eventual structure or component formed by the deposition process.

As indicated above, the present invention relates to reconfiguration of the deposition wire such that there is an increase in the lateral dimension presented to the laser beam 3 (FIG. 1). FIGS. 3 to 7 illustrate example cross-sections created by such reconfiguration.

FIG. 3 illustrates an elliptical or oval cross-section 31. This cross-section 31 is created generally by rolling the round configuration (FIG. 2) between two relatively simple cylinder rollers which compress the presented original wire either side whilst normally guide rollers will be used on either side in order to limit the lateral width 32 of the wire formed.

FIG. 4 illustrates a dumbbell cross-section 41. This dumbbell cross-section 41 is created with compressing rollers which create the desired central dimple effect 42 between the relatively larger edge bulging of the cross-section 41. Again, generally the originally presented round wire will be compressed either side by opposed cylinder rollers incorporating the necessary surface relief pattern to create the central dimple 42 channel whilst guide rollers either side will constrain the lateral expansion of the wire.

FIG. 5 illustrates a semi-circle or half moon cross-section 51. Typically, this cross section 51 will be created by presenting the original round cross-section wire (FIG. 2) between a channel die and an upper roller. Thus, the upper roller will force the wire into engagement with the channel such that the wire assumes the bottom shaping, that is to say a round curve 52 whilst the upper surface 53 is flattened as illustrated. FIG. 6 illustrates a serrated back cross-section 61. In a similar fashion to that described with respect to the semi-circle cross-section depicted in FIG. 5 the serrated back cross section 61 will generally be compressed into an open channel with the compressing roller creating a serrated back 62 as illustrated.

FIG. 7 illustrates a cross-section in which a wire 71 comprising a central core 72 of powder deposition material is surrounded by a containment sheath 73. In use, this containment sheath 73 will be mixed with the deposition material of the core 72 upon melting by the laser beam. Thus, deposition of the desired composition will be achieved in the layers as described previously with regard to FIG. 1 in order to create a structure or component. As can be seen in FIG. 7 this wire combination of powder core 72 and containment sheath 73 is reconfigured in order to increase the lateral dimension and therefore overlap with the laser beam.

Clearly, the reconfiguration as described in accordance with the present invention may itself create work hardening of the wire. Thus, in accordance with the present invention generally the wire is heated prior to such reconfiguration. As will be described later (FIG. 9) this heating is typically achieved inductively but could also be achieved by passing the wire through an appropriate oven or other heating environment. By elevating the temperature of the wire during the reconfiguration it will be appreciated that the wire becomes more malleable and therefore more easily reconfigured in accordance with the present invention.

The purpose of the increase in the lateral dimension in accordance with the reconfiguration is to widen the presented angle of that wire to the laser beam 3 (FIG. 1). A flatter aspect creates a broader range of acceptable angles for the laser beam 3 (FIG. 1) such that the wire is more consistently heated and therefore melted to achieve appropriate deposition.

By increasing the lateral dimension variations in the surface of the deposition wire in terms of reflectivity and contamination are substantially rendered irrelevant by the greater acceptable incident angles for the laser beam 3. Nevertheless, in order to further improve melting performance, typically at least a presented surface of the deposition wire will be knurled or otherwise roughened.

FIG. 8 illustrates a wire 81 reconfigured in the lateral dimension in accordance with the present invention with knurling 82 applied to its outer surface. The presented surface, that is to say the upper surface of the wire when placed upon the base 4 or previous layers of deposited material, at least is knurled or otherwise roughened. However, in order to provide ease of such knurling it will be appreciated that generally the whole surface of the presented wire will be knurled. It will also be understood that knurling will generally be provided to the outer surface of the wire prior to reconfiguration in the lateral dimension in accordance with the present invention. Such knurling after reconfiguration to increase the lateral dimension may itself alter the dimensions of the wire, create distortion or otherwise vary the specified performance. It will be understood that it may be possible to combine the reconfiguration in the lateral dimension with the surface knurling using the same deformation press rollers.

It will be appreciated that normally relatively fine wires are used in order to achieve the desired deformation. The present invention provides improvement in the laser beam absorption efficiency and so it is possible that thicker wire could be used. This would permit more rapid deposition at each pass and therefore a greater thickness of the deposition material layer 7 (FIG. 1) provided upon each pass.

Although wire is far better than powder with respect to positional control even in its original round cross-section, provision of reconfiguration to increase the lateral dimension itself will improve the possible level of positional control. By increasing the lateral dimension the wire in that direction is rendered stiffer and therefore when projected beyond the guide sleeve 8 (FIG. 1) can be more accurately positioned both relative to the base 4 or previous deposition layers 7 as well as the laser beam 3. Furthermore, as there is more positional control, it is possible to extend the wire 5 further beyond the guide 8 to allow depositions in more confined spaces, e.g. between blades for repair as the guide 8 need not enter the confined space.

As indicated above, surface contamination can vary the performance of the wire 5 upon heating by the beam 3. Clearly contamination may increase if the surface of the wire is knurled or otherwise roughened. However, as indicated above, generally the reconfiguration as well as the surface knurling will occur just prior to presentation to the laser beam 3 for deposition so that although care must be taken with regard to contamination the problems with such contamination are diminished by the relatively short period in which such contamination can occur.

Generally, the deposition wire used with respect to laser deposition methods is very fine. Typically, the wire will be 0.5 to 0.8 mm in diameter. The reconfiguration as indicated above is normally achieved through compression using rollers and therefore care should be taken with respect to ensuring that there is limited if any work hardening of the wire by such reconfiguration. Use of elevated temperatures in order to increase the malleability of the wire can greatly diminish the effects of work hardening.

Figure 10:
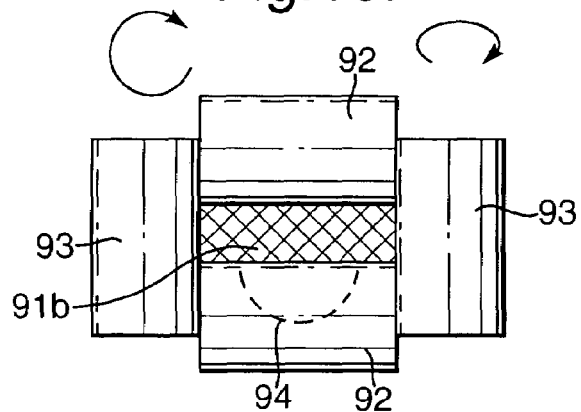
FIG. 10 is a schematic front view of the reconfiguration arrangement depicted in FIG. 9.

FIG. 9 illustrates a schematic cross-section of a deposition wire 91 prior to presentation to reconfiguration rollers 92 and after in accordance with the present invention. Thus, the original wire 91a is presented in the direction of arrow head A such that as it passes through the reconfiguration rollers 92 and essentially exits with an increased lateral dimension. The original wire is heated by a heater 95 to inhibit work hardening during reconfiguration. The heater 95 has electrical coils through which an electrical current is passed to generate heat which in turn heats the wire 91 as it passes through the heater 95. Alternatively, the heater 95 may be an induction heater of known type. As indicated previously, typically two substantially cylindrical rollers 92 either side of the wire create the desired deformation compression in order to reconfigure the wire 91 to increase its lateral dimension. Guide rollers 93 (FIG. 10) will be provided to restrict lateral movement and therefore the extent of the increase in the lateral dimension. It is essentially the broadening of the original wire in order to create a flatter wire cross-section which achieves the desired increase in laser beam interaction and therefore consistency with respect to melting of the deposition wire 91. The rollers 92 may be driven in order that the wire is specifically drawn by those rollers between them to create the desired reconfiguration or the wire 91 itself may be driven through the rollers 92 in order to achieve the desired increase in lateral dimension. As indicated previously, typically the rollers 92 will incorporate means to create knurling at least on the presented upper surface of the wire 91 upon which the laser beam will be incident.

In order to inhibit oxidation of the wire it is possible that the reconfiguration will be subject to temperature control and/or is conducted in an inert (Argon, $CO_2$) atmosphere.

In order to create the semi-circle and serrated cross-sections depicted in FIGS. 5 and 6 the bottom roller may be replaced by a channel anvil such that the original wire is compressed into that anvil. Broken line 94 illustrates the shape of that anvil channel in order to create the semi-circle and serrated back configurations depicted in FIGS. 5 and 6. Clearly, with regard to FIG. 6 the upper roller would also incorporate cutting edges in order to create the serrated back. Similarly, with respect to the dumbbell cross-section depicted in FIG. 4 it will be understood that the upper and lower rollers will be shaped in order to create the central dimple channel by relief compression into the originally presented deposition wire.

Most advantageously, the increase in lateral dimension of the wire will be maximised within the constraints of possible work hardening of the wire.

Figure 11:
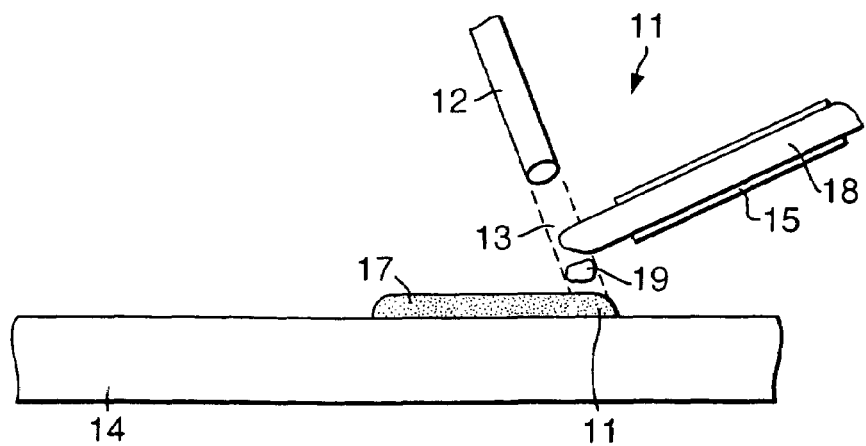
FIG. 11 is a basic schematic cross-section illustrating direct laser deposition where the deposition wire is presented above a base.

FIG. 11 illustrates as a basic schematic cross-section a similar laser deposition arrangement 11 to that depicted in FIG. 1. However, a deposition wire 15 is presented such that an end of that wire 15 is above layers of deposited material 17 with a deposition pool 16 below that end of the wire 15. In such circumstances a laser 12 through a laser beam 13 heats the wire 15 such that drops 19 of molten deposition material fall into the pool 16 and become fused with the previously deposited layer 17 in order to create a structure. This structure 17 is formed upon a base 14 in a manner similar to that described with regard to FIG. 1.

By presenting the wire 15 away from the pool 16 and layers 17 it will be appreciated that the laser beam 13 will generally act directly on the end of the wire 15 rather than the whole wire and pool as described with regard to arrangement 1 in FIG. 1. Such an arrangement may be more thermally efficient and reduce heat loss through conduction and maintaining molten pool temperature higher than necessary. It will also be understood that by the arrangement depicted in FIG. 11 movement of a wire 15 relative to the layers 17 and base 14 in order to create more intricate structures or strangle walls by lateral motions of the wire 15 in the direction of deposition may be achieved.

What is claimed is:

1. A method of laser deposition using a laser and deposition wire, the method characterised in that the original wire is heated and cross-sectionally reconfigured to increase the lateral dimension of the presented wire for greater overlap with a presented beam from the laser which melts the wire for deposition, wherein the wire comprises a deposition powder core held within a retaining sheath.

2. A method of laser deposition using a laser and deposition wire, the method characterised in that the original wire is heated and cross-sectionally reconfigured to increase the lateral dimension of the presented wire for greater overlap with a presented beam from the laser which melts the wire for deposition, wherein at least a presented surface of the wire is knurled or otherwise roughened to reduce reflectivity of the presented beam, and wherein the knurling or roughening of the wire is conducted prior to reconfiguration.

* * * * *